United States Patent [19]

Fraser et al.

[11] 4,363,904
[45] Dec. 14, 1982

[54] HIGH TEAR STRENGTH POLYMERS

[75] Inventors: William A. Fraser, Princeton; Norma J. Maraschin, Somerset; Frederick J. Karol, Belle Mead, all of N.J.; Alexander J. Makai, Charleston, W. Va.

[73] Assignee: Union Carbide Corporation, Danbury, Conn.

[21] Appl. No.: 246,913

[22] Filed: Mar. 23, 1981

Related U.S. Application Data

[62] Division of Ser. No. 49,555, Jun. 18, 1979, abandoned.

[51] Int. Cl.$^3$ ........................................... C08F 210/16
[52] U.S. Cl. ................................. 526/348.2; 428/216; 526/348.6; 526/916
[58] Field of Search .................... 526/348.6, 916, 348.2

[56] References Cited

U.S. PATENT DOCUMENTS

| | | | |
|---|---|---|---|
| 2,975,159 | 3/1961 | Weinmayr | 260/80.5 |
| 3,222,332 | 12/1965 | Duck et al. | 260/80.5 |
| 3,298,792 | 1/1967 | Di Drusco | 526/351 |
| 3,645,992 | 2/1972 | Elston | 526/348.6 |
| 4,076,698 | 2/1978 | Anderson et al. | 526/348.6 |
| 4,124,532 | 11/1978 | Giannini et al. | 526/125 |
| 4,243,619 | 1/1981 | Fraser et al. | 526/348.6 |
| 4,293,673 | 10/1981 | Hayer et al. | 526/348.6 |

FOREIGN PATENT DOCUMENTS

| | | |
|---|---|---|
| 53-24990 | 7/1978 | Japan . |
| 1532780 | 11/1978 | United Kingdom . |
| 1543908 | 4/1979 | United Kingdom . |

*Primary Examiner*—Stanford M. Levin
*Attorney, Agent, or Firm*—John S. Piscitello

[57] ABSTRACT

Heterogeneous ethylene based hydrocarbon copolymers having high tear strength properties in film form, formed from ethylene, $C_{3-4}$ monomer and $C_{5-8}$ monomer with a molar ratio in the polymer of ($C_{3-4}/C_2$) of about 0.006 to 0.09, a ($C_{5-8}/C_2$) ratio of about 0.003 to 0.07 and having a Chain Branch Factor of about 0.2 to 0.8 and a narrow molecular weight distribution; a gas phase process for making such polymers, and film made from such polymers.

7 Claims, 1 Drawing Figure

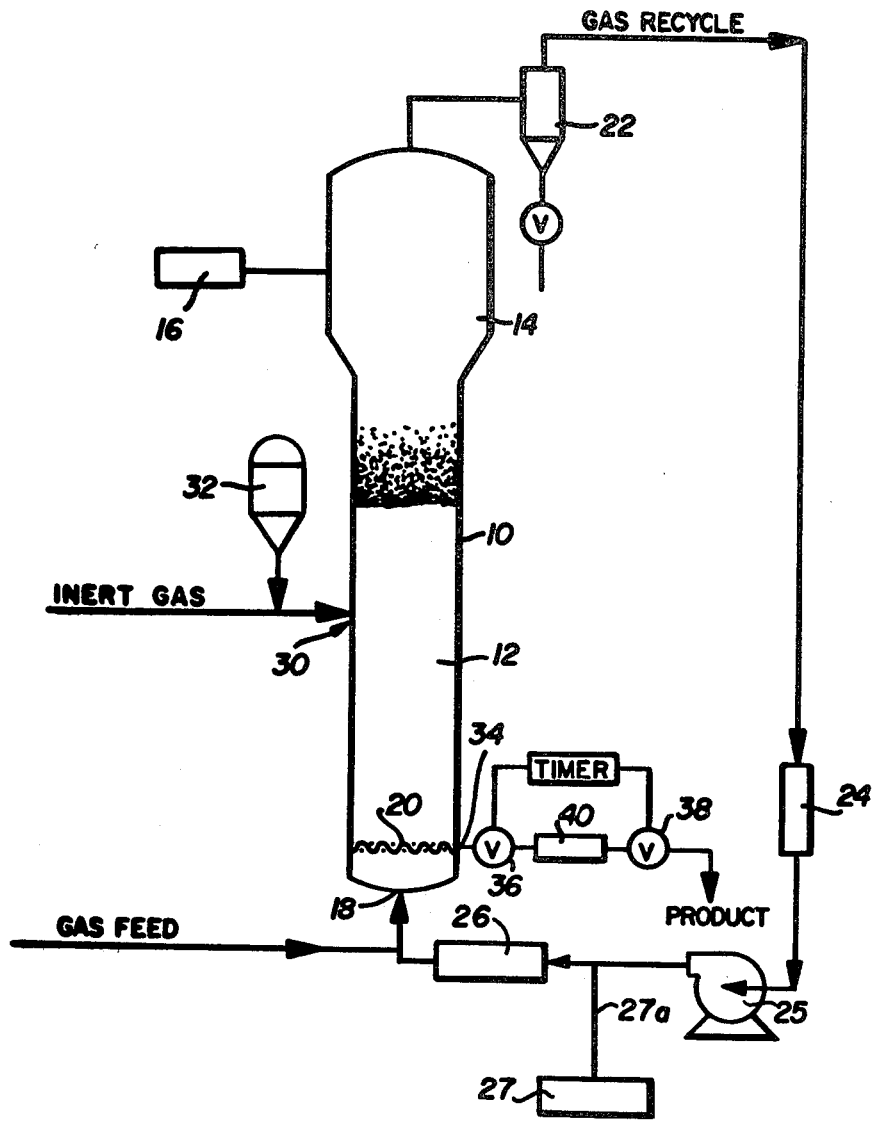

HIGH TEAR STRENGTH POLYMERS

This application is a division of our prior U.S. application: Ser. No. 49,555, filing date, June 18, 1979, now abandoned.

BACKGROUND OF THE INVENTION

1. Field of the Invention

This invention relates to film grade ethylene based hydrocarbon copolymers and film made therefrom.

2. Description of the Prior Art

U.S. Pat. No. 4,076,698 (filed originally Mar. 1, 1956 and issued Feb. 28, 1978) discloses the preparation of film grade hydrocarbon polymers made from ethylene and higher alpha olefins in slurry or solution polymerization systems. This patent teaches that, in order to produce film having optimum mechanical properties (Elmendorf Tear Strength) from ethylene copolymers, it is necessary to copolymerize the ethylene with $C_5$ to $C_8$ comonomers.

U.S. Pat. No. 3,645,992 (filed Feb. 15, 1968 and issued Feb. 29, 1972) teaches that within the family of partially crystalline hydrocarbon copolymers of ethylene and various higher alpha monoolefins (e.g., butene-1, hexene-1 and octene-1), the physical properties of such resins depend not only on the molecular weight and molecular weight distribution of the polymer and on the amount and type of higher alpha olefin comonomer incorporated into the copolymer, but also upon the distribution of the comonomer units along and among all the polymer molecules. A clear distinction is made between copolymers in which the comonomer units are distributed randomly along a polymer chain but do not have the same ethylene/comonomer ratio among the polymer molecules (these are termed heterogeneous copolymers) as compared to copolymers in which the comonomer units are distributed randomly along a polymer molecule and have the same ethylene/comonomer ratio among the polymer molecules (these are termed homogeneous copolymers). The patent also teaches that these homogeneous copolymers exhibit better properties in the form of extruded film than heterogeneous copolymers made with the same comonomer and having the same density.

U.S. Pat. No. 3,645,992 also teaches that homogeneous terpolymers such as those of ethylene, propylene or butene-1 and octene-1 can be prepared with the therein disclosed vanadium based Ziegler type catalyst and process. These homogeneous terpolymers had physical properties nearly equivalent to those of the corresponding homogeneous ethylene/octene-1 copolymers.

Several recently filed United States patent applications, i.e.,

Ser. No. 012,720, filed Feb. 16, 1979, now U.S. Pat. No. 4,302,565, by G. L. Goeke et al and entitled "Impregnated Polymerization Catalyst, Process for Preparing and Use For Ethylene Copolymerization", and Ser. No. 012,795 filed Feb. 16, 1979, now U.S. Pat. No. 4,243,619, by W. A. Fraser et al and entitled "Process For Molding Film From Low Density Ethylene Hydrocarbon Copolymer", disclose the preparation of ethylene hydrocarbon copolymers in a gas phase process, particularly a fluid bed process, which can be operated at relatively low pressures, of up to about 1000 psi. The copolymers are formed from a major mol percent ($\geqq 90$) of ethylene and a minor mol percent ($\leqq 10$) of one or more $C_3$ to $C_8$ alpha olefins. These copolymers are heterogeneous and may be used to form film therefrom.

Attempts to make film grade resins having optimum physical properties in the form of copolymers made from ethylene and hexene-1 in the gas phase fluid bed polymerization processes disclosed in these recently filed United States patent applications however, have encountered problems when $C_5$–$C_8$ comonomers are employed. The polymerization reaction involved is an exothermic reaction. In order to conduct the reaction continuously in a commercially feasible manner it is necessary to recirculate the unreacted monomers and to remove excess heat (of reaction) from the recycled monomers in a heat exchanger. Where $C_5$ to $C_8$ comonomers are used these monomers tend to condense out in the reactor system and lead to (i) the production of sticky or tacky polymers which are difficult to handle and process, (ii) the plugging of the gas distribution plate used in such fluid bed reactors, (iii) the fouling of sensing elements inserted in the reactor system for the purpose of monitoring and controlling the reaction conditions, and (iv) reactor temperature control problems due to heat capacity variations.

$C_2/C_4$ copolymers having a density of 0.91 to 0.94 and a melt index of about 2.0 when made with the catalysts of these recently filed U.S. patent applications (which are also the catalysts used in the present inventions) have, in compression molded film form, Elmendorf tear strength values in the range of about 10 (at 0.94 density) to about 260 (at 0.91 density). $C_2/C_6$ copolymers having a density of 0.91 to 0.94 and a melt index of about 2.0 when made with the catalysts of these recently filed U.S. patent applications (which are also the catalysts used in the present invention) will have, in compression molded film form, Elmendorf tear strength values in the range of about 25 (at 0.94 density) to about 500 (at 0.91 density). Based on these data (and the prior art noted above) it would be expected that $C_2/C_4/C_6$ heterogeneous terpolymers (where $C_4$ content = $C_6$ content) having a density of 0.91 to 0.94 and a given melt index, when made with the same catalysts, would have poor physical properties and/or Elmendorf tear strength values lying midway between the Elmendorf tear strength values of such $C_2/C_4$ and the $C_2/C_6$ copolymers.

It has now been unexpectedly found that copolymers formed from ethylene, and at least one of propylene and butene-1 and at least one $C_5$–$C_8$ comonomer with the catalyst systems and process of the present invention, are heterogeneous copolymers, and in compression molded film form exhibit intrinsic Elmendorf tear strengths which are nearly equivalent to that of the corresponding copolymer of ethylene and one (only) of the $C_5$ to $C_8$ comonomer made with the same catalyst.

The heterogeneous nature of the polymers of the present invention is demonstrated by their melting points and by polymer fractionation tests.

SUMMARY OF THE INVENTION

It has now been unexpectedly found that film having optimum mechanical properties can be prepared from heterogeneous ethylene hydrocarbon copolymers containing $C_3$–$C_4$ comonomers, if such copolymers are also prepared with a relatively small amount of $C_5$–$C_8$ comonomers using the catalysts of the present invention, as described below, and that such copolymers can be prepared in gas phase processes employing recycled unreacted comonomers if the polymerization process of the present invention, as described below, is employed to prepare such polymers.

An object of the present invention is to provide film grade ethylene hydrocarbon copolymers which, in film form, have optimum mechanical properties.

Another object of the present invention is to provide film made from ethylene based polymers having optimum mechanical properties.

A further object of the present invention is to provide a continuous process for making such polymers under gas phase conditions with one or more $C_5$–$C_8$ comonomers which must be recycled without being allowed to condense out.

BRIEF DESCRIPTION OF THE DRAWING

The drawing shows a gas phase fluid bed reactor system in which the copolymers of the present invention may be prepared.

DESCRIPTION OF THE PREFERRED EMBODIMENT

The Ethylene Copolymers

The ethylene copolymers of the present invention are interpolymers or copolymers of the monomers $C_2$, $C_a$ and $C_b$, wherein $C_2$ is ethylene, $C_a$ is selected from propylene, butene-1 and mixtures thereof, and $C_b$ is selected from one or more of the $C_5$ to $C_8$ alpha mono-olefins which contain no branching closer than the fourth carbon atom. The $C_5$ to $C_8$ monomers include pentene-1, 4-methyl pentene-1, hexene-1, heptene-1 and octene-1. These polymers are heterogeneous.

The $C_2$, $C_a$ and $C_b$ monomer units are believed to be randomly distributed along the polymer chain and do not have the same ethylene/comonomer ratio among the polymer molecules. The molar ratio of $C_a/C_2$ monomer units in the polymer mas is about 0.006 to 0.09. The molar ratio of $C_b/C_2$ monomer units in the polymer mass is about 0.003 to 0.07. In addition, the $C_a$ and $C_b$ monomers are also used in such amounts as to provide a Branch Chain Factor value of about 0.1 to 0.9 and preferably of about 0.2 to 0.8, where the $$\text{Branch Chain Factor} = \frac{\text{number of carbon branches of } C_3 \text{ to } C_6 \text{ length in polymer}}{\text{total number of carbon branches (of } C_1 \text{ to } C_6 \text{ length) in polymer.}}$$

The copolymers have a density of about 0.91 to 0.94 and preferably of about 0.915 to 0.930, grams per cubic centimeter, a melt flow ratio of $\geq 22$ to $\leq 36$ and preferably of about $\geq 25$ to $\leq 32$, and a melt index of about 0.5 to 5.0, and preferably of about 0.8 to 4.0, decigrams per minute.

In compression molded film form copolymers having a density of about 0.920 have an intrinsic (Elmendorf) tear strength of about 100 to 800. In blown film form these copolymers have a Elmendorf tear strength of about 60 to 600 grams/mil.

The melt flow ratio value is another means of indicating the molecular weight distribution of a polymer. The melt flow ratio (MFR) range of $\geq 22$ to $\leq 36$ thus corresponds to a $M_w/M_n$ value range of about 2.7 to 4.3 and the MFR range of $\geq 25$ to $\leq 32$ corresponds to a $M_w/M_n$ range of about 2.8 to 3.8.

The melt index of a copolymer is a reflection of its molecular weight. Polymers having a relatively high molecular weight, have a relatively low melt index. The melt index of the copolymers which are made in the process of the present invention is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio. In addition to hydrogen, other chain transfer agents such as dialkyl zinc compounds may also be used to further increase the melt index of the copolymers.

The copolymers of the present invention have an unsaturated group content of $\leq 1$, and usually of $\geq 0.1$ to $\leq 0.6$, $C=C/1000$ carbon atoms.

The copolymers have a n-hexane extractables content (at 50° C.) of less than about 5.5, and preferably, of less than about 4.0 weight percent.

The copolymers when made in the process of the present invention have a residual catalyst content, in terms of parts per million of titanium metal, of the order of $>0$ to $\leq 20$ parts per million, (ppm) at a productivity level of $\geq 50,000$ and of the order of $>0$ to $\leq 10$ ppm at a productivity level of of $\geq 100,000$ and of the order of $>0$ to $\leq 3$ parts per million at a productivity level of $\geq 300,000$. In terms of Cl, Br or I residues, the copolymers of the present invention have a Cl, Br or I residue content which depends upon the Cl, Br or I content of the catalyst precursor. From the Ti to Cl, Br or I ratio in the initial catalyst precursor, it is possible to calculate Cl, Br, or I residues from knowledge of the productivity level based on titanium residue only. For many of the copolymers of the present invention made only with Cl containing components of the catalyst system (Cl/Ti=7), one can calculate a Cl residue content of $>0$ to $\leq 140$ ppm at a productivity of $\geq 50,000$, a Cl content of $>0$ to $\leq 70$ ppm at a productivity of $\geq 100,000$, and a Cl content of $>0$ to $\leq 20$ ppm at a productivity of $\geq 300,000$. The copolymers are readily produced in the process of the present invention at productivities of up to about 1,000,000.

The copolymers are granular materials which have an average particle size of the order of about 0.005 to about 0.07 inches, and preferably, of about 0.02 to about 0.04 inches in diameter. The particle size is important for the purposes of readily fluidizing the polymer particles in the fluid bed reactor, as decribed below. The copolymers have a bulk density of about 14 to 31 pounds per cubic foot.

The copolymers can be readily produced in a low pressure gas phase fluid bed reaction process, as disclosed below, if a specific monomer charge is polymerized under a specific set of operating conditions, as disclosed below, and in the presence of a specific high activity catalyst, which is also described below.

High Activity Catalyst

The compounds used to form the high activity catalyst used in the present invention comprise at least one titanium compound, at least one magnesium compound, at least one electron donor compound, at least one activator compound, and at least one porous inert carrier material, as defined below.

The titanium compound has the structure

wherein R is a $C_1$ to $C_{14}$ aliphatic or aromatic hydrocarbon radical, or COR' where R' is a $C_1$ to $C_{14}$ aliphatic or aromatic hydrocarbon radical, X is selected from the group consisting of Cl, Br, I, or mixtures thereof, a is 0 to 1, b is 2 to 4 inclusive and a+b=3 or 4.

The titanium compounds can be used individually or in combinations thereof, and would include $TiCl_3$ and $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure $$MgX_2$$

wherein X is selected from the group consisting of Cl, Br, I, or mixtures thereof. Such magnesium compounds can be used individually or in combinations thereof and would include $MgCl_2$, $MgBr_2$ and $MgI_2$. Anhydrous $MgCl_2$ is the particularly preferred magnesium compound.

About 0.5 to 56, and preferably about 1 to 10, mols of the magnesium compound are used per mol of the titanium compound in preparing the catalysts employed in the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are partially or completely soluble. The electron donor compounds are known as such, or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ether; $C_3$ to $C_6$, and preferably $C_3$ to $C_4$, aliphatic ketones. The most preferred of these electron donor compounds would include methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

About 2 to 85, and preferably about 3 to 10 mols of the electron donor compound are used per mol of Ti.

The activator compound has the structure $$Al(R''')_c X'_d H_e$$

wherein X' is Cl or OR''', R'' and R''' are the same or different and are $C_1$ to $C_{14}$ saturated hydrocarbon radicals, d is 0 to 1.5, e is 1 or 0 and c+d+e=3.

Such activator compounds can be used individually or in combinations thereof and would include $Al(C_2H_5)_3$, $Al(C_2H_5)Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(C_2H_5)_2(OC_2H_5)$.

About 10 to 400, and preferably about 10 to 100, mols of the activator compound are used per mol of the titanium compound in activating the catalyst employed in the present invention.

The carrier materials are solid, particulate porous materials which are inert to the other components of the catalyst composition, and to the other active components of the reaction system. These carrier materials would include inorganic materials such as oxides of silicon and/or aluminum. The carrier materials are used in the form of dry powders having an average particle size of about 10 to 250, and preferably of about 50 to 150 microns. These materials are also porous and have a surface area of $\geq 3$, and preferably of $\geq 50$, square meters per gram. Catalyst activity or productivity is apparently also improved with silica having pore sizes of $\geq 80$ Angstrom units and preferably of $\geq 100$ Angstrom units. The carrier material should be dry, that is, free of absorbed water. Drying of the carrier material is carried out by heating it at a temperature of $\geq 600°$ C. Alternatively, the carrier material dried at a temperature of $\geq 200°$ C. may be treated with about 1 to 8 weight percent of one or more of the aluminum alkyl compounds described above. This modification of the support by the aluminum alkyl compounds provides the catalyst composition with increased activity and also improves polymer particle morphology of the resulting ethylene polymers.

Catalyst Preparation: Formation of Precursor

The catalyst used in the present invention is prepared by first preparing a precursor composition from the titanium compound, the magnesium compound, and the electron donor compound, as described below, and then impregnating the carrier material with the precursor composition and then treating the impregnated precursor composition with the activator compound in one or more steps as described below.

The precursor composition is formed by dissolving the titanium compound and the magnesium compound in the electron donor compound at a temperature of about 20° C. up to the boiling point of the electron donor compound. The titanium compound can be added to the electron donor compound before or after the addition of the magnesium compound, or concurrent therewith. The dissolution of the titanium compound and the magnesium compound can be facilitated by stirring, and in some instances by refluxing these two compounds in the electron donor compound. After the titanium compound and the magnesium compound are dissolved, the precursor composition may be isolated by crystallization or by precipitation with a $C_5$ to $C_8$ aliphatic or aromatic hydrocarbon such as hexane, isopentane or benzene.

The crystallized or precipitated precursor composition may be isolated, in the form of fine, free flowing particles having an average particle size of about 10 to 100 microns and a bulk density of about 18 to 33 pounds per cubic foot.

When thus made as disclosed above the precursor composition has the formula $$Mg_m Ti_1(OR)_n X_p [ED]_q$$

wherein ED is the electron donor compound,
m is $\geq 0.5$ to $\leq 56$, and preferably $\geq 1.5$ to $\leq 5$,
n is 0, 1 or 2,
p is $\geq 2$ to $\leq 116$, and preferably $\geq 6$ to $\leq 14$,
q is $\geq 2$ to $\leq 85$, and preferably $\geq 4$ to $\leq 11$,
R is a $C_1$ to $C_{14}$ aliphatic or aromatic hydrocarbon radical, or COR' wherein R' is a $C_1$ to $C_{14}$ aliphatic or aromatic hydrocarbon radical and, X is selected from the group consisting of Cl, Br, I or mixtures thereof.

The subscript for the element titanium (Ti) is the arabic numeral one.

Catalyst Preparation: Impregnation of Precursor in Support

The precursor composition is then impregnated, in a weight ratio of about 0.033 to 1, and preferably about 0.1 to 0.33, parts of the precursor composition into one part by weight of the carrier material.

The impregnation of the dried (activated) support with the precursor composition may be accomplished by dissolving the precursor composition in the electron donor compound, and by then admixing the support with the dissolved precursor composition so as to allow the precursor composition to impregnate the support. The solvent is then removed by drying at temperatures of $\leq 70°$ C.

The support may also be impregnated with the precursor composition by adding the support to a solution of the chemical raw materials used to form the precursor composition in the electron donor compound, without isolating the precursor composition from such solution. The excess electron donor compound is then removed by drying or washing and drying at temperatures of $\leq 70°$ C.

Activation of Precursor Composition

In order to be used in the process of the present invention the precursor composition must be fully or completely activated, that is, it must be treated with sufficient activator compound to transform the Ti atoms in the precursor composition to an active state.

It has been found that, in order to prepare a useful catalyst it is necessary to conduct the activation in such a way that, at least the final activation stage must be conducted in the absence of solvent so as to avoid the need for drying the fully active catalyst to remove solvent therefrom. Two procedures have been developed to accomplish this result.

In one procedure, the precursor composition is completely activated, outside the reactor, in the absence of solvent, by dry blending the impregnated precursor composition with the activator compound. In this dry blending procedure the activator compound is used while impregnated in a carrier material. In this procedure the fully activated precursor composition is prepared without having to heat the composition above 50° C. prior to feeding it to the polymerization reactor.

In the second, and preferred of such catalyst activation procedures, the precursor composition is partially activated outside the polymerization reactor with enough activator compound so as to provide a partially activated precursor composition which has an activator compound/Ti molar ratio of $>0$ to $<10:1$ and preferably of about 4 to 8:1. This partial activation reaction is preferably carried out in a hydrocarbon solvent slurry followed by drying of the resulting mixture, to remove the solvent, at temperatures between 20 to 80, and preferably of 50° to 70° C. The resulting product is a free-flowing solid particulate material which can be readily fed to the polymerization reactor. The partially activated and impregnated precursor composition is fed to the polymerization reactor where the activation is completed with additional activator compound which can be the same or a different compound.

The additional activator compound and the partially activated impregnated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The additional activator compound is added to the reactor in such amounts as to provide, in the reactor, with the amounts of activator compound and titanium compound fed with the partially activated and impregnated precursor composition, a total Al/Ti molar ratio of $\geq 10$ to 400 and preferably of about 15 to 60. The additional amounts of activator compound added to the reactor, react with, and complete the activation of, the titanium compound in the reactor.

In a continuous gas phase process, such as the fluid bed process disclosed below, discrete portions of the partially or completely activated precursor composition impregnated on the support are continuously fed to the reactor, with discrete portions of any additional activator compound needed to complete the activation of the partially activated precursor composition, during the continuing polymerization process in order to replace active catalyst sites that are expended during the course of the reaction.

The Polymerization Reaction

The polymerization reaction is conducted by contacting a stream of the monomers, in a gas phase process, such as in the fluid bed process described below, and substantially in the absence of catalyst poisons such as moisture, oxygen, carbon monoxide, carbon dioxide and acetylene with a catalytically effective amount of the completely activated precursor composition (the catalyst) impregnated on a support at a temperature and at a pressure sufficient to initiate the polymerization reaction.

In order to achieve the desired density ranges in the copolymers it is necessary to copolymerize enough of the (i) $C_a$ comonomers with ethylene and the $C_b$ comonomers to achieve a level of about $\geq 0.6$ to 9 mol percent of the $C_a$ comonomer in the copolymer, and (ii) $C_b$ comonomers with ethylene and the $C_a$ comonomers to achieve a level of about $\geq 0.3$ to 7 mol percent of the $C_b$ comonomer in the copolymer. The amounts of the $C_a$ and $C_b$ comonomers needed to achieve this result will depend on the particular comonomers employed.

There is provided below a listing of the amounts, in mols, of various $C_a$ and $C_b$ comonomers that are copolymerized with ethylene in order to provide polymers having the desired density range at any give melt index. The listing also indicates the relative molar concentration, of such comonomers to ethylene, which are to be present in the recycled gas stream of monomers ($C_2$, $C_a$ and $C_b$) under reaction equilibrium conditions in the reactor.

| $C_x$ comonomer | $C_x/C_2$ mol Ratio in gas phase at equilibrium | $C_x/C_2$ mol Ratio in polymer |
| --- | --- | --- |
| propylene | 0.2 to 0.9 | 0.01 to 0.09 |
| butene-1 | 0.1 to 0.5 | 0.006 to 0.08 |
| pentene-1 | 0.05 to 0.2 | 0.005 to 0.07 |
| hexene-1 | 0.02 to 0.15 | 0.004 to 0.06 |
| 4-methyl-pentene-1 | 0.02 to 0.15 | 0.004 to 0.06 |

-continued

| $C_x$ comonomer | $C_x/C_2$ mol Ratio in gas phase at equilibrium | $C_x/C_2$ mol Ratio in polymer |
|---|---|---|
| heptene-1 | 0.017 to 0.10 | 0.003 to 0.04 |
| octene-1 | 0.015 to 0.08 | 0.003 to 0.04 |

Gas ratios higher than those needed in the gas phase are fed to the reactor to maintain such ratios during the reaction.

A fluidized bed reaction system which can be used in the practice of the process of the present invention is illustrated in FIG. 1. With reference thereto the reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, P. 100–111 (1966).

It is essential that the bed always contains particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated precursor compound (the catalyst) used in the fluidized bed is preferably stored for service in a reservoir 32 under a blanket of a gas which is inert to the stored material, such as nitrogen and argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn and to compensate for such amounts of the gaseous monomers as are lost in recovering the polymer from the reactor. The composition of the make-up gas is determined based on an analysis of the recycle gas by a gas analyzer 16 positioned above the bed. The gas analyzer determines the composition of the gas being recycled and the feed rate of the components of the make-up gas are adjusted accordingly to maintain an essentially steady state gaseous composition within the reaction zone.

To insure complete fluidization, the recycle gas and, where, desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then compressed in a compressor 25 and then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed downstream of the heat exchanger 26.

The $C_2$, $C_a$ and $C_b$ monomers are fed into the reactor through gas inlet 18. To avoid condensation of the $C_5$–$C_8$ comonomers, in particular, in the reaction system it is desirable to maintain the temperature of the $C_2/C_a/C_b$ gas mixture in the reaction system above the dew point of such mixture. This is primarily done by maintaining the temperature of the gas mixture at least about 3° to 10° C. above the dew point of the gas mixture. This may be done by adjusting the temperature of the cooling medium in heat exchanger 26. Any of the $C_5$ to $C_8$, in particular, comonomers that may condense out on the cooling surfaces of heat exchanger 26 are readily revaporized by contact with a portion or all of the recycled gas stream which is maintained at a temperature above the dew point.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type, and the like. The elements of the plate may all be stationary, or the plate may be of the mobile type disclosed in U.S. Pat. No. 3,298,792. Whatever its design, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the reaction system at the hottest portion of the gas which is usually downstream from heat exchanger 26. Thus, the activator may be fed into the gas recycle system from dispenser 27 thru line 27A.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention as molecular weight control or chain transfer agents, that is, to increase the melt index values of the copolymers that are produced. About 0 to 50, and preferably about 20 to 30, mols of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent material, such as silica, of the types described above, in amounts of about 10 to 50 weight percent. These compositions tend to be pyrophoric. The zinc compound may be added alone, or with any additional portions of the activator compound that are to be added the the reactor from a feeder, not shown, which could be positioned adjacent dispenser 27, near the hottest portion of the gas recycle system.

It is essential to operate the fluid bed reactor at a temperature below the sintering temperature of the polymer particles. To insure that sintering will not occur, operating temperatures below the sintering temperature are desired. For the production of ethylene copolymers in the process of the present invention an operating temperature of about 65° to 105° C. is preferred, and a temperature of about 75° to 95° C. is most preferred. Temperatures of 80° to 90° C. are used to prepare products having a density of about 0.91 to 0.92, and temperatures of about 85° to 92° C. are used to prepare products having a density of about >0.92 to 0.94.

The fluid bed reactor is operated at pressures of from about 50 to about 1000 psi, and is preferably operated at a pressure of from about 150 to 350 psi, with operation at the higher pressures in such ranges favoring heat transfer since an increase in pressure increases the unit volume heat capacity of the gas. An increase in pressure also increases the dew point of the gas mixture.

The partially or completely activated precursor composition is injected into the bed at a rate equal to its consumption at a point 30 which is above the distribution plate 20. Injecting the catalyst at a point above the distribution plate is an important feature of this invention. Since the catalysts used in the practice of the invention are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst such as nitrogen or argon is used to carry the partially or completely activated precursor composition, and any additional activator compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas entering the reactor is adjusted upwards or downwards to accommodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temmperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst system of this invention appears to yield a fluid bed product having an average particle size between about 0.005 to about 0.07 inches and preferably about 0.02 to about 0.04 inches.

The feed stream of gaseous monomer, with or without inert gaseous diluents, is fed into the reactor at a space time yield of about 1 to 10 pounds/hour/cubic foot of bed volume.

EXAMPLES

The following examples are designed to illustrate the polymers of the present invention and their formation and are not intended as a limitation on the scope thereof.

The properties of the polymers disclosed herein were determined by the following test methods.

| | |
|---|---|
| Density | ASTM D-1505 - Plaque is conditioned for one hour at 100° C. to approach equilibrium crystallinity-Reported as grams per cubic centimeter (g/cm$^3$); All density measurements are made in a density gradient column. |
| Melt Index (MI) | ASTM D-1238 - Condition E-measured at 190° C. - reported as grams per 10 minutes. |
| Flow Rate (HLMI) | ASTM D-1238 - Condition F measured at 10 times the weight used in the melt index test above. |
| Melt Flow Ratio (MFR) | = Flow Rate/Melt Index. |
| Molecular Weight Distribution, Mw/Mn | Gel Permeation Chromatography Styragel Packing: Pore size packing sequence is 10$^7$, 10$^5$, 10$^4$, 10$^3$, 60 A. Solvent: Perchloroethylene at 117° C. Detection: Infrared at 3.45 μm. |
| Unsaturation | Infrared Spectrophotometer (Perkin Elmer Model 21) Pressings 25 mils in thickness are used. Absorbance is measured at 10.35 μm for trans vinylene; 11.00 μm for terminal vinyl, and 11.25 μm for pendant vinylidene. The absorbance per mil at each wavelength is directly proportional to the product of unsaturation concentration and absorptivity. Absorptivities were taken from the literature values of deKock, R.J. and Hol, P., A., H., M., J. Poly. Sci. Part B, 2, 339 (1964). |
| Tm °C. | Each resin sample, run as a 5-6 mil thick film was subject to the same thermal pre-treatment prior to data collection. Specimens were heated under nitrogen at full power to 150° C., held isothermally for 5 minutes, and then cooled at the rate of 10° C./minute to 50° C. For measurements of the melting point the heating rate was 10° C./minute. Measurements are made on a duPont differential thermal analyzer - Model 990. |
| Intrinsic Elmendorf Tear Strength | A 2½ in. × 3½ in. film specimen is subject to a "pant leg" type tear. This is a pendulum impulse type test. It measures the force required to propagate a tear. The tear strength is measured in grams. The data presented herein have been normalized by film thickness and reported as grams/mil. |
| Compression Molding of film sample for intrinsic Elmendorf tear strength test | A 5 mil thick compression molded film having little molecular orientation is prepared using the following press conditions: preheat sample at 170° C. for 7 minutes at minimum pressure, then press sample at 2500 psi for 3 minutes, and then cool quickly to 20 to 30° C. at a rate of 20 to 30° C./minute. |
| Bulk Density | The resin is poured via ⅜ inches diameter funnel into a 100 ml graduated cylinder to 100 ml line without shaking the cylinder, and weighed by difference. The data are reported in lbs/ft$^3$. |
| Productivity | A sample of the resin product is ashed, and the weight % of ash is determined; since the ash is essentially composed of the catalyst, the productivity is thus the pounds of polymer produced per pound of total catalyst consumed. The amount of Ti, Mg and Cl in the ash are determined by elemental analysis. |
| n-hexane extractables | (FDA test used for polyethylene film intended for food contact applications). A 200 square inch sample of 1.5 mil gauge film is cut into strips measuring 1" × 6" and weighed to the nearest 0.1 mg. The strips are placed in a vessel and extracted with 300 ml of n-hexane at 50 ± 1° C. for 2 hours. The extract is then decanted into tared culture dishes. After drying the extract in a vacuum desiccator the culture dish is weighed to the nearest 0.1 mg. The extractables, normalized with respect to the original sample weight, is then reported as the weight fraction of n-hexane extractables. |

EXAMPLES

Ia. Preparation of Impregnated Precursor

In a 12 liter flask equipped with a mechanical stirrer are placed 41.8 g (0.439 mol) anhydrous MgCl$_2$ and 2.5 liter tetrahydrofuran (THF). To this mixture, 27.7 g (0.184 mol) TiCl$_4$ is added dropwise over ½ hour. It may be necessary to heat the mixture to 60° C. for about ½ hour in order to completely dissolve the material.

The precursor composition can be isolated from solution by crystallization or precipitation. It may be analyzed at this point for Mg and Ti content since some of the Mg and/or Ti compound may have been lost during the isolation of the precursor composition. The empirical formulas used herein in reporting the precursor compositions are derived by assuming that the Mg and the Ti still exist in the form of the compounds in which they were first added to the electron donor compound. The amount of electron donor is determined by chromatography.

500 g of porous silica dehydrated at 800° C. and optionally treated with 4 to 8 wt. % triethyl aluminum is added to the above solution and stirred for ¼ hour. The mixture is dried with a N$_2$ purge at 60° C. for about 3-5 hours to provide a dry free flowing powder having the particle size of the silica. The absorbed precursor composition has the formula

$TiMg_{3.0}Cl_{10}(THF)_{6.7}$

Ib. Preparation of Impregnated Precursor from Preformed Precursor Composition In a 12 liter flask equipped with a mechanical stirrer, 146 g of precursor composition is dissolved in 2.5 liters dry THF. The solution may be heated to 60° C. in order to facilitate dissolution. 500 g of porous silica is added and the mixture is stirred for ¼ hour. The mixture is dried with a N$_2$ purge at ≦60° C. for about 3-5 hours to provide a dry free flowing powder having the particle size of the silica.

II. Activation Procedure

The desired weights of impregnated precursor composition and activator compound are added to a mixing tank with sufficient amounts of anhydrous aliphatic hydrocarbon diluent such as isopentane to provide a slurry system.

The activator compound and precursor compound are used in such amounts as to provide a partially activated precursor composition which has an Al/Ti ratio of $>0$ to $\leq 10:1$ and preferably of 4 to 8:1.

The contents of the slurry system are then thoroughly mixed at room temperature and at atmospheric pressure for about $\frac{1}{4}$ to $\frac{1}{2}$ hour. The resulting slurry is then dried under a purge of dry inert gas such as nitrogen or argon, at atmospheric pressure and at a temperature of $65° \pm 10°$ C. to remove the hydrocarbon diluent. This process usually requires about 3 to 5 hours. The resulting catalyst is in the form of a partially activated precursor composition which is impregnated within the pores of the silica. The material is a free flowing particulate material having the size and shape of the silica. It is not pyrophoric unless the aluminum alkyl content exceeds a loading of 10 weight percent. It is stored under a dry inert gas such as nitrogen or argon prior to future use. It is now ready for use and injected into, and fully activated within, the polymerization reactor.

When additional activator compound is fed to the polymerization reactor for the purpose of completing the activation of the precursor composition, it is fed into the reactor as a dilute solution in a hydrocarbon solvent such as isopentane. These dilute solutions contain about 5 to 30% by volume of the activator compound.

The activator compound is added to the polymerization reactor so as to maintain the Al/Ti ratio in the reactor at a level of about $\geq 10$ to 400:1 and preferably of 15 to 60:1.

EXAMPLES 1 to 5

Ethylene was terpolymerized with butene-1 and hexene-1 in each of this series of examples to produce terpolymers having a density of 0.921 to 0.927 and a melt index of 1.75 to 2.75.

In these examples the silica impregnated catalyst precursor was formed as described above. The silica impregnated catalyst system contained 20.0 weight % of precursor composition. The silica support used for the catalysts of these examples was treated with 4% by weight of triethyl aluminum, before it was used to make the supported catalyst system. In each of these examples the precursor composition was partially activated with the aluminum compound shown in Table A, according to the procedure as described above, so as to provide the impregnated precursor with an Al/Ti mol ratio as shown in Table A. The completion of the activation of the precursor composition in the polymerization reactor was accomplished with a 5% by weight solution of triethyl aluminum in isopentane so as to provide the completely activated catalyst in the reactor with an Al/Ti mol ratio of about 50.

Each of the polymerization reactions was conducted for about 1 hour, after equilibrium was reached, at 85° C. and under a pressure of 150 to 250 psig, a gas velocity of about 3 to 6 times $G_{mf}$ and a space time yield of about 4 to 6 pounds/hour/cubic foot of bed space in a fluid bed reactor system as described in the Drawing referred to above. It has a lower section 10 feet high and $13\frac{1}{2}$ inches in (inner) diameter, and an upper section which was 16 feet high and $23\frac{1}{2}$ inches in (inner) diameter. The reactor inlet (gas) temperature was in the range of 70° to 85° C. The dew points of the gas mixtures were in the range of 45°–55° C. at an operating pressure of 150 psig and in the range of 50°–65° C. at an operating pressure of 200–250 psig.

Table A below lists the activator compound and Al/Ti mole ratio in preparing the partially activated precursor composition; the reaction pressure; the $H_2/C_2$, $C_4/C_2$ and $C_6/C_2$ mol ratios in the reactors; and the dew point of the gas mixture used in each example.

Table B below lists properties of the resins made in Examples 1 to 5, i.e., density; melt index (M.I.); melt flow ratio (MFR); bulk density; productivity; branches; BCF values; intrinsic tear strengths and melting points (M.P.).

The average intrinsic tear strength values of the terpolymers of Examples 1–5 were $\geq 85\%$ of the average intrinsic tear strength values of ethylene-hexene-1 copolymers having a density of about 0.92 and a melt index of about 2.0 that could be made with the catalyst systems of the present invention. The intrinsic tear strength values of the terpolymers of such examples were also approximately two times the tear strength values of ethylene-butene-1 copolymers having the same approximate density and melt index values, and made with the catalyst systems of the present invention.

TABLE A
REACTION CONDITIONS FOR PRODUCTION OF TERPOLYMERS IN FLUID BED REACTOR

| Example | Activator | Al/Ti ratio in part. act. precursor | Temperature °C. | Pressure psig | $H_2/C_2$ ratio | $C_4/C_2$ ratio | $C_6/C_2$ ratio |
|---|---|---|---|---|---|---|---|
| 1 | THAL | 5.6 | 85 | 200 | 0.18 | 0.13 | 0.11 |
| 2 | THAL | 5.6 | 85 | 150 | 0.21 | 0.16 | 0.16 |
| 3 | TEAL | 3.0 | 85 | 250 | 0.23 | 0.13 | 0.08 |
| 4 | THAL | 5.6 | 85 | 225 | 0.25 | 0.17 | 0.07 |
| 5 | TEAL | 3.0 | 85 | 250 | 0.26 | 0.24 | 0.07 |

THAL = trihexyl aluminum
TEAL = triethyl aluminum

TABLE B
COMPOSITION OF TERPOLYMERS PREPARED UNDER CONDITIONS SHOWN IN TABLE A

| Example | Density g/cc | M.I. dg/min | MFR | Bulk Density | Productivity | Branches/1000C atoms in polymer chain $C_2H_5$ | Branches/1000C atoms in polymer chain $C_4H_9$ | BCF | Intrinsic Tear Strength g/mil | M.P. Tm, ° |
|---|---|---|---|---|---|---|---|---|---|---|
| 1 | 0.918 | 1.9 | 30 | 24 | 1000 | 11 | 13.3 | 0.55 | 350 | 122.7 |
| 2 | 0.919 | 1.75 | 31 | 23 | 700 | 8.5 | 9.8 | 0.54 | 320 | |
| 3 | 0.927 | 1.8 | 29 | 18 | 2800 | 5.1 | 5.4 | 0.51 | 235 | 123.6 |
| 4 | 0.921 | 2.4 | 27 | 25 | 1400 | 8.9 | 9.0 | 0.50 | 268 | 122.9 |
| 5 | 0.921 | 2.75 | 30 | 14 | 1900 | 11.9 | 8.0 | 0.40 | 306 | 122.1 |

EXAMPLE 6

Ethylene was terpolymerized with propylene and hexene-1 in this example.

The catalyst was prepared as in Examples 1-5, and the catalyst precursor was partially activated with triethyl aluminum so as to provide the impregnated precursor with an Al/Ti mol ratio of about 6.5.

The polymerization reaction was conducted as in Examples 1-5 for about 1 hour, after equilibrium was reached, at 85° C. and under a pressure of 270 psig, a gas velocity of about 3 to 4 times $G_{mf}$, and a space time yield of about 5 to 6 pounds/hour/cubic foot of bed space. The reactor inlet (gas) temperature was in the range of 70°-80° C., and the dew point of the gas mixture was in the range of 40°-62° C.

The molar gas ratios used in the reactor were $H_2/C_2=0.16$; $C_3/C_2=0.23$; $C_6/C_2=0.10$.

The resulting terpolymer was heterogeneous, with a melting point of 120.5° C. (Tm). It had a density of 0.918, a melt index of 2.0, a MFR of 25-29 and a bulk density of 19-21. It was produced at a productivity level of about 2000.

The polymer had 10.5 $CH_3$ branches and 9.5 $C_4H_9$ branches per 1000 C atoms, and a BCF of 0.47. It had an intrinsic tear strength of 377 g/mil. The intrinsic tear strength of this terpolymer is $\geq 85\%$ of the tear strength of ethylene hexene-1 copolymers having the same melt index and density when made with the same catalyst.

The melting point values of the terpolymers produced in all these examples indicates that the polymers are heterogeneous.

Short Chain Branch frequency in the polymer was measured using a $^{13}C$ NMR (nuclear magnetic resonance) test procedure, on a Varian model CFT-20 test instrument. Test samples were dissolved in deuterated ortho dichlorobenzene at a concentration of 10% polymer by weight at a temperature of 120° C. Accumulated scans numbered $\geq 30,000$.

What is claimed is:

1. An ethylene based hydrocarbon polymer comprising ethylene, $C_a$ monomer and $C_b$ monomer,
   wherein the $C_a$ monomer is selected from propylene, butene-1 and mixtures thereof, and the $C_b$ monomer is selected from one or more $C_5$ to $C_8$ alpha monoolefins which contain no branching closer than the fourth carbon atom
   the molar ratio in the polymer of $(C_a/C_2)$ is about 0.006 to 0.09 and the molar ratio of $(C_b/C_2)$ is about 0.003 to 0.07, and the Branch Chain Factor is about 0.2 to 0.8, and said polymer being heterogeneous and having a density of about 0.91 to 0.94,
   n-hexane extractables content at 50° C. of less than about 5.5 weight percent,
   melt index of about 0.5 to 5.0,
   $M_w/M_n$ of about 2.7 to 4.3, and
   melt flow ratio of about 22 to 36.
2. A polymer as in claim 1 in which $C_a$ is propylene.
3. A polymer as in claim 1 in which $C_a$ is butene-1.
4. A polymer as in claim 2 or 3 in which $C_b$ is hexene-1.
5. A polymer as in claim 4 having a density of about 0.92 and an Elmendorf tear strength in compression molded film form of about 100 to 800 grams/mil.
6. Film formed from the polymer of claim 1.
7. Film formed from the polymer of claim 5.

* * * * *

UNITED STATES PATENT AND TRADEMARK OFFICE
CERTIFICATE OF CORRECTION

PATENT NO. : 4,363,904

DATED : December 14, 1982

INVENTOR(S) : William Allen Fraser et al.

It is certified that error appears in the above—identified patent and that said Letters Patent is hereby corrected as shown below:

Summary sheet, column 2, "Hayer et al." should read -- Hamer et al. --.

Column 2, line 28, "tions)" should read -- tion) --.

Column 3, line 30, "4-methyl pentene-1" should read -- 4-methyl-pentene-1 --.

Column 3, line 36, "mas should read -- mass --.

Column 5, line 60, "$Al(C_2H_5)Cl$" should read -- $Al(C_2H_5)_2Cl$ --.

Column 8, line 53, "give" should read -- given --.

Column 11, line 34, "the" (first occurrence) should read -- to --.

Column 12, line 23, "temmperature" should read -- temperature --.

UNITED STATES PATENT AND TRADEMARK OFFICE
CERTIFICATE OF CORRECTION

PATENT NO. : 4,363,904  Page 2 of 2

DATED : December 14, 1982

INVENTOR(S) : William Allen Fraser et al.

It is certified that error appears in the above-identified patent and that said Letters Patent is hereby corrected as shown below:

Column 16, Table B, last column, "Tm,°" should read -- Tm, °C.

Signed and Sealed this

Sixteenth Day of August 1983

[SEAL]

Attest:

Attesting Officer

GERALD J. MOSSINGHOFF

Commissioner of Patents and Trademarks